US007786678B2

(12) United States Patent  
Kurt et al.

(10) Patent No.: US 7,786,678 B2
(45) Date of Patent: Aug. 31, 2010

(54) FEEDBACK CONTROL SYSTEM FOR CONTROLLING THE LIGHT OUTPUT OF A LED UNIT

(75) Inventors: Ralph Kurt, Eindhoven (NL); Eduard Johannes Meijer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 583 days.

(21) Appl. No.: 11/719,299

(22) PCT Filed: Nov. 14, 2005

(86) PCT No.: PCT/IB2005/053745

§ 371 (c)(1),
(2), (4) Date: May 15, 2007

(87) PCT Pub. No.: WO2006/054230

PCT Pub. Date: May 26, 2006

(65) Prior Publication Data

US 2009/0140659 A1 Jun. 4, 2009

(30) Foreign Application Priority Data

Nov. 19, 2004 (EP) .................................. 04105921

(51) Int. Cl.
*H05B 41/36* (2006.01)

(52) U.S. Cl. ...................... 315/158; 315/149; 315/291

(58) Field of Classification Search ................. 315/291, 315/294, 297, 299, 300, 301, 307, 308, 149, 315/150, 158, 185 R
See application file for complete search history.

(56) References Cited

U.S. PATENT DOCUMENTS 6,495,964 B1 12/2002 Muthu et al.
6,630,801 B2 * 10/2003 Schuurmans ................. 315/307

FOREIGN PATENT DOCUMENTS

WO  WO02099333 A1  12/2002

* cited by examiner

*Primary Examiner*—Douglas W Owens
*Assistant Examiner*—Jianzi Chen

(57) ABSTRACT

The present invention relates to a control system (13) and method for controlling the light output of an emitting unit (11) having at least one LED (15) and emitting light of at least one color. The control system (13) comprises a feedback based on a detection unit (19) detecting the light output of the emitting unit (11), a detection pulse generator (27), a suppression unit (23) suppressing environmental light interferences in detected light, and a control unit (21) for controlling the light output of the emitting unit on basis of a comparison between a reference signal representing a desired light output of the emitting unit and an output signal of the suppression unit. The detection pulse generator (27) generates detection pulses a-periodically. Thus, an a-periodicity is introduced into the feedback processing of the light output. This provides a possibility by means of conventional suppression algorithms to eliminate or reduce interfering environmental light, particularly pulsed light.

16 Claims, 3 Drawing Sheets

FEEDBACK CONTROL SYSTEM FOR CONTROLLING THE LIGHT OUTPUT OF A LED UNIT

FIELD OF THE INVENTION

The present invention relates to a control system for controlling the light output of a LED (Light Emitting Diode) emitting unit, a LED emitting unit and a method for controlling a LED emitting unit.

BACKGROUND OF THE INVENTION

White light emitting units, or colour tuneable emitting units having arrays of coloured LEDs, such as RGB LED luminaries and LED displays, are of interest for several reasons. For example, they are low cost and efficient, and the chromaticity of their light output is adjustable.

However, the light output of the LEDs varies from LED to LED, as well as over the life time of each LED. Additionally, the light output of the LEDs varies inversely with temperature, and the variation is different for different colours. The varying output of a LED is also a problem in single LED emitting units. Many solutions for achieving a stable light output from emitting units have been tried. In those solutions different kinds of feedback control have been introduced. Thus, the light output is detected and the detections are used for controlling the energising of the LEDs. One prior art solution is disclosed in U.S. Pat. No. 6,495,964, where the light output of the emitting unit is detected for different colour combinations, by turning off the LED(s) for the colour to be detected. Thus, several detection pulses are generated sequentially during a time period, while performing a coordinated sequential turn off of LEDs emitting light of different colours.

This and other prior art solutions will work fairly well in a substantially dark environment, where the emitting unit is the exclusive light source. However in most practical cases this assumption does not hold. Also a part of the environmental light is usually able to reach the detector embedded in the emitting unit. This contribution has to be discriminated in the feedback part of the control system from the light emitted by the LEDs themselves in order to prevent colour or luminance errors. This is of particular importance in applications with strong requirements on chromaticity and stability of colour point in time. This discrimination is for example done by subtraction. Depending on the application and the specific situation in which such LED emitting units are used, standard continuous background subtraction does not give sufficiently good results. By continuous background subtraction means detecting any remaining light while all LEDs are turned off. In particular pulsed light sources, such as TL tubes, monitors or other LED modules, in the neighbourhood can cause troubles. Assume, for example, that a TL tube accidentally always emits while the red light contribution is measured. Then the detector will see a distorted light, which will cause the provision of wrong information to the control circuitry, which will, in turn, cause an erroneous setting of the colour mix.

SUMMARY OF THE INVENTION

It is an object of the present invention to eliminate or reduce the prior art drawbacks described above, and provide an emitting unit control that is more independent from the environmental light conditions.

This object is achieved by a control system for controlling the light output of a LED emitting unit according to the present invention as claimed in claim 1, by a method for controlling a LED emitting unit as claimed in claim 11, and by a LED emitting unit as claimed in claim 10.

The invention is based on an insight that by measuring the output light a-periodically the likelihood of significantly reducing interference caused by a periodically pulsed external light source is high.

Thus, in one aspect of the present invention, there is provided a control system for controlling the light output of an emitting unit comprising at least one LED and emitting light of at least one colour. The control system comprises a detection unit detecting the light output of the emitting unit and providing a light output signal, a detection pulse generator providing detection pulses to the detection unit, and a suppression unit suppressing environmental light interferences in the light output signal and providing an improved light output signal.

The control system further comprises a control unit for controlling the light output of the emitting unit on basis of a comparison between a reference signal representing a desired light output of the emitting unit and the improved light output signal, wherein the detection pulse generator generates detection pulses a-periodically.

According to another aspect thereof, the invention provides a method for controlling an emitting unit comprising at least one LED and emitting light of at least one colour. The method comprises the steps of:
  a-periodically detecting light output of the emitting unit and thus generating a light output signal;
  suppressing environmental interference in the light output signal and thus generating an improved light output signal;
  comparing the improved light output signal with a reference signal representing a desired light output of the emitting unit; and
  controlling the light output of the emitting unit on basis of said comparison.

Thus, in accordance with this invention, the optical feedback for the emitting unit is substantially improved relative to the prior art. The control and stability of chromaticity of the light output is also significantly improved.

It should be noted that by an emitting unit comprising at least one LED is meant any unit that has one or more LEDs of any kind. Some examples of different types of emitting units and LEDs are LED luminaries, typically comprising a number of differently coloured LEDs, individual LEDs, LED lamps, displays and display like devices, such as pixelated lamps or light sources, OLED (Organic LED) displays, PolyLED displays, light emitting textiles, arrays of LEDs used for signage or illumination, etc.

It should also be noted that by light output of the emitting unit is meant both on and off states, that is both when the LED(s) are on and when they are off. In the latter case, of course, if the detected light output is above zero it is interfering environmental, or background, light that is detected.

In accordance with an embodiment of the control system of this invention, as claimed in claim 2, the a-periodicity is obtained by generating the detection pulses irregularly, i.e. a-periodically. It should be noted that this a-periodicity is present at least on a relatively short time scale. Thus, is might occur that after a few tens or hundreds of frames the pattern repeats itself, i.e. becomes periodic. For the purposes of this application, a frame is defined as a time element to which the start times of the pulses are related. Thus, the time, or time axis, is divided into equal time portions, where each portion is referred to as a frame. A frame comprises at least one emission period of the/each LED. According to this embodiment, pulsed environmental light that occurs quite often during the same time portion of the frame is less likely to interfere with the detections of emitting unit output light.

In accordance with an embodiment of the control system of this invention, as claimed in claim 3, in some time intervals of a frame a certain detection pulse is repeated, and in other time intervals of the same frame it is not generated at all. This gives a further spreading of the detection in time, which enhances the suppression of periodic environmental light.

In accordance with an embodiment of the control system of this invention, as claimed in claim 4, in some frames a certain detection pulse is repeated, and in other frames it is not generated at all. This gives a further spreading of the detection in time, which enhances the suppression of periodic environmental light.

In accordance with embodiments of the control system as claimed in claim 5 and 6, different kinds of a-periodic LED emission are provided. Since the time period when a specific colour combination of LED light exists is displaced from one frame to another, the detection pulses that are associated with a specific colour combination occurs a-periodic. Thus, also these embodiments can be regarded as involving a-periodic detection pulse generation, or an equivalent thereof, even if the very pulses are generated at the same times in every frame.

In accordance with an embodiment of the control system of this invention, as claimed in claim 7, the suppression unit comprises an averaging unit. Thereby a-periodic fluctuations are averaged out providing a remainder which to an increased part is associated with true LED light.

In accordance with an embodiment of the control system of this invention, as claimed in claim 7, the suppression unit comprises a subtraction unit. Thereby it is possible to subtract a background light signal from the light output signal. An increase in the part of the light output signal that is associated with true LED light is obtained. Preferably the subtraction unit is combined with the averaging unit for obtaining a good background light signal to be subtracted.

Corresponding embodiments of the method according to this invention are associated with corresponding advantages.

These and other aspects and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
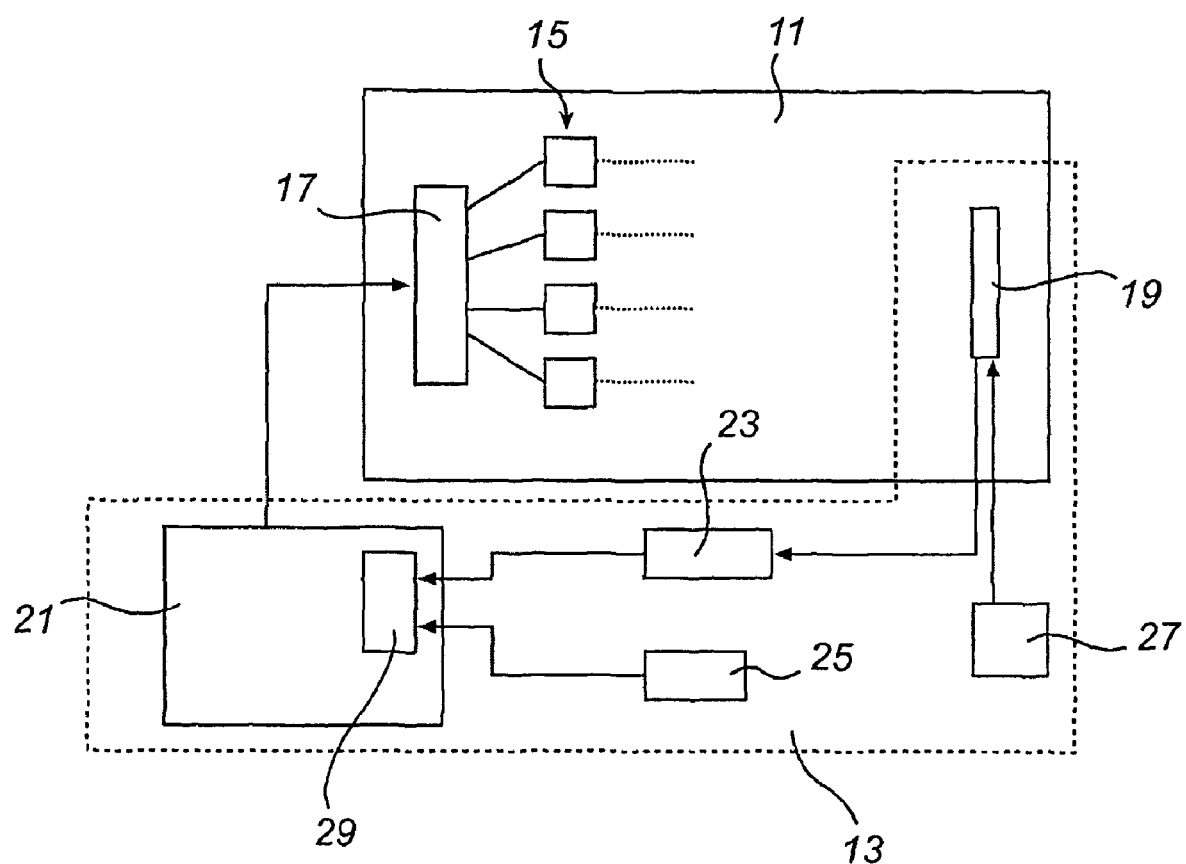
FIG. 1 is a schematic block diagram of an emitting unit and a control system according to an embodiment of the present invention.

In FIG. 1 an emitting unit 11 and a control system thereof 13 are most schematically shown. The emitting unit 11 comprises an array of LEDs 15 and a power supply unit 17 for energising the LEDs 15. The LEDs 15 emit light of different colours; primarily blue, green and red light. Typically, as known to a person of ordinary skill in the art, the control system 13, the power supply unit 17 and the LEDs 15 are all arranged on a PCB (Printed Circuit Board). However, only those parts used for describing some embodiments are shown in FIG. 1.

The control system comprises a detection unit 19, which is used for detecting light emitted from the emitting unit 11, and a control unit 21 for controlling the light output of the emitting unit 11 on basis of the detected light. More particularly, the control system comprises a suppression unit 23, which has an input that is connected to an output of the detection unit 19 for receiving a light output signal from the detection unit 19, and an output that is connected to the control unit 21 for feeding an improved light output signal thereto. The control system 13 further comprises a reference generation unit 25, which is connected to the control unit 21, and a detection pulse generator 27, connected to the detection unit 19. The control unit 21 comprises a comparator 29.

Figure 2A:
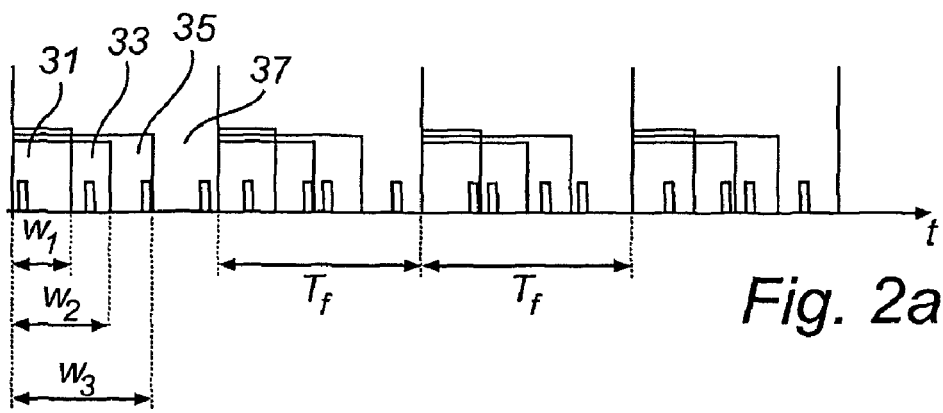
FIGS. 2a-g show timing diagrams for different embodiments of the control system and the method of the present invention.

The control system operates as follows. The time is divided into frames as defined above, where the length, i.e. duration, of a frame is called frame time or frame period $T_f$, see FIG. 2a. Within the frame time of each frame LEDs emitting different coloured light emit during differently wide time windows. Referring to FIG. 2a, assume for example that all LEDs 15 emitting red light are emitting light within a time window 31 the width, i.e. duration, of which is w1; that the green LEDs 15 emit light within a time window 33, the width of which is w2, which is greater than w1, and that the blue LEDs 15 emit light within a time window 35 the width of which is w3, where w3 is greater than w2. Since the beginning of each one of the three time windows 31, 33, 35 coincides with the beginning of the frame they overlap. Thus, within the red light window 31, below also called first period, green and blue light is present as well in the output light of the emitting unit 11. Within a second period, between the end of the red light window 31 and the end of the green light window 33, green light and blue light is present. Within a third period, between the end of the green light window and the end of the blue light window only blue light is present. Finally, within a fourth period between the end of the blue light window and the beginning of the next frame, no LED 15 is emitting light.

In this embodiment the detection pulse generator 27 generates one pulse within each one of the first to fourth periods, i.e. four pulses per frame in total. The pulses control the operation of the detection unit 19, such that during every pulse the detection unit 19 detects, i.e. measures, the light output of the emitting unit 11. Any environmental interfering light is added to the LED light, and is thus also detected. During the fourth pulse merely environmental interfering light, for example a constant background light, if any, is detected. For every frame the pulses are displaced within the periods in relation to a previous frame. The displacements are preferably determined quasi-randomly, although any appropriate method is applicable. A person skilled in the art is able to decide upon this matter. For each detection performed the detection unit 10 generates a light output signal, that is fed to the suppression unit 23. The suppression unit 23 suppresses interfering light signal portions of the light output signal, by means of some suppression algorithm known to the skilled person. The suppression unit comprises an averaging unit, performing an averaging operation. For example, standard averaging is used, where the measurements of a predetermined number e.g. 10 of light output signals are added and then divides by that number. Another method is floating average. Again a predetermined number of values are averaged. If a new value is added the oldest in the list is deleted and again an average is taken. This method allows adjustment of settings in each frame. Yet another possibility is weighted averaging. It should be noted that other methods than averaging methods are useable for filtering out disturbing periodic environmental light contributions. One example thereof is Fourier analysis, e.g. frequency analysis.

In this way, since the detection pulses are a-periodically generated, at least periodic pulsed environmental light is suppressed in addition to constant environmental background light. Due to the a-periodic detection in form of pulse displacements, an external light signal pulse that periodically occurs in one and the same period of said first to fourth periods is not detected at every occurrence, and thereby its relative influence on the total signal level of the light output signal is decreased. Thus, the suppression unit 23 outputs an improved light output signal, which is fed to the control unit 21.

The control unit 21 compares, by means of a comparator 29 the improved light output signal with a reference signal as regards the chromaticity, i.e. colour balance and light intensity, of the signals. If there is a difference, the control unit 21 will generate appropriate adjustment signals, which are fed to the power supply unit 17. Due to the averaging this adjustment is not done every frame but more seldom, e.g. every 10 frames, depending on which averaging method is used and on the present application of the emitting unit. Typically, the power supply unit 17 will generate PWM (Pulse Width Modulation) voltage signals to the LEDs 15. Other types of modulation of the energising signals are of course possible, as understood by the skilled person. Some examples thereof are frequency modulation, amplitude modulation, bit angle, or digital, modulation, phase angle modulation, and bit voltage modulation. It should be noted that, in the case of for example frequency modulation, the frame time $T_f$ varies. Then the detection pulse generator 27 is arranged to scale with the changes. In all cases the frame time is shorter than about 20 ms, corresponding to a frequency of 50 Hz, which is the typical retardation time of a human eye. The pulse width per LED is determined by the desired light intensity of that colour, i.e. it depends on the required chromaticity and dimming capacity of the emitting unit 11.

The adjustment signals will trigger adjustments of the voltage pulses to obtain a change in the light output of the LEDs 15, as regards the intensity of the LED light of different colours. In case of PWM, as shown in FIG. 2a, the adjustment of the intensities is done by changing the width of the time windows w1-w3.

Figure 2B:
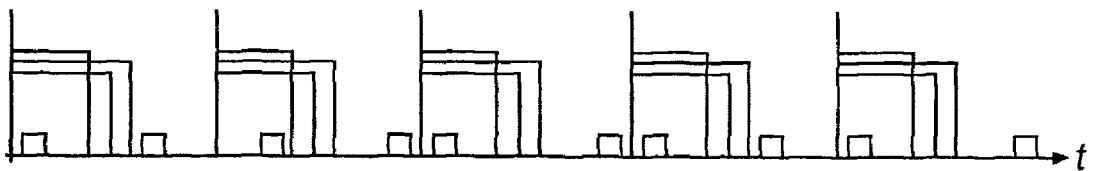

The timing diagram of an alternative embodiment is shown in FIG. 2b. Here only two detection pulses are generated each frame. A first pulse is generated during w1, i.e. when all colours are present in the emitting unit output light. A second pulse is generated when all LEDs 15 are turned off. Like in the previous embodiment the pulses are generated at different times, in relation to the beginning of the frame, in different frames.

Figure 2C:
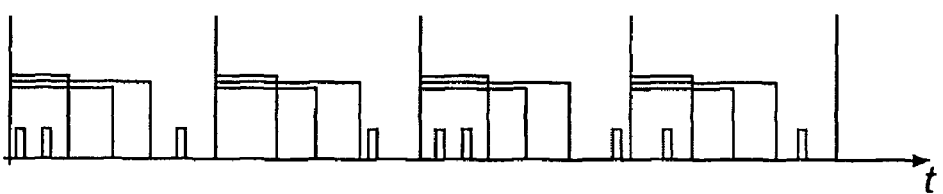

The timing diagram of yet an alternative embodiment, which is a modification of the just described embodiment, is shown in FIG. 2c. Here the detection pulse for measuring the light output of the LEDs 15 is occasionally repeated within a frame, and occasionally omitted. Thus, in some frames there are two such pulses and in some frames there is no such pulse. In yet other frames there is one such pulse.

Figure 2D:
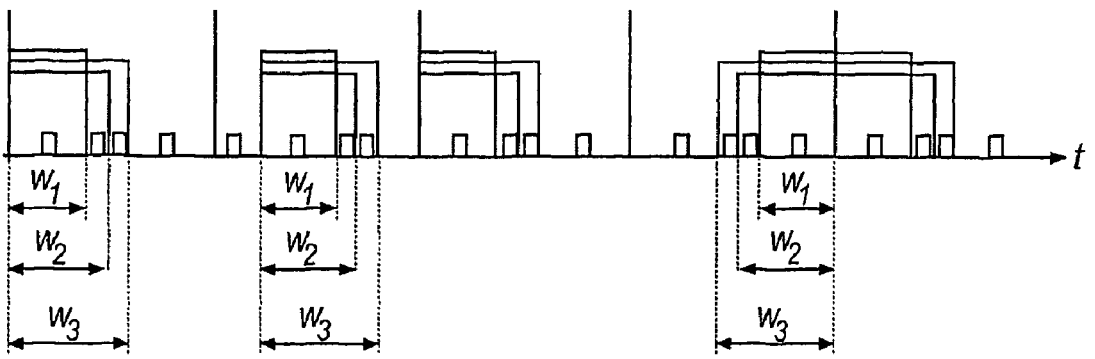

The timing diagram of yet an alternative embodiment is shown in FIG. 2d. Here the a-periodic character is obtained by either shifting or mirroring the LED emission windows w1-w3. Thus, from the first frame to the second frame in the figure the time windows w1-w3 have been shifted to the right, i.e. delayed. That has caused the first detection pulse to occur in the black period instead of in the full colour period, etc. When performing computations for processing the light output signals the control unit knows these shifted characters of the detections. From the fourth frame to the fifth frame the time windows have been mirrored in the border between the frames. The result of these time window operations is the same as if the very detection pulses were generated at different times as described above.

Figure 2E:
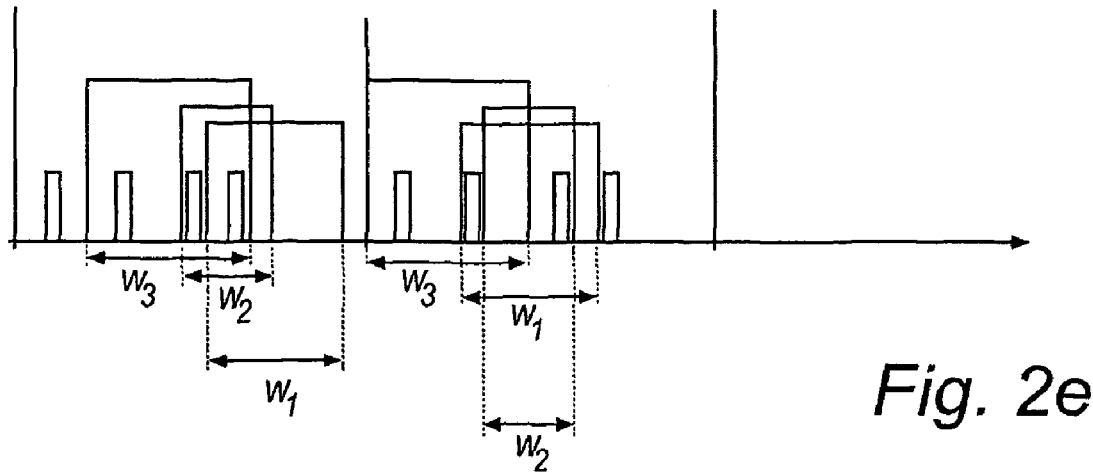

The timing diagram of yet an alternative embodiment is shown in FIG. 2e. Here the LED emission windows are more randomly shifted, but the result is the same as in the previously described embodiment.

Figure 2F:
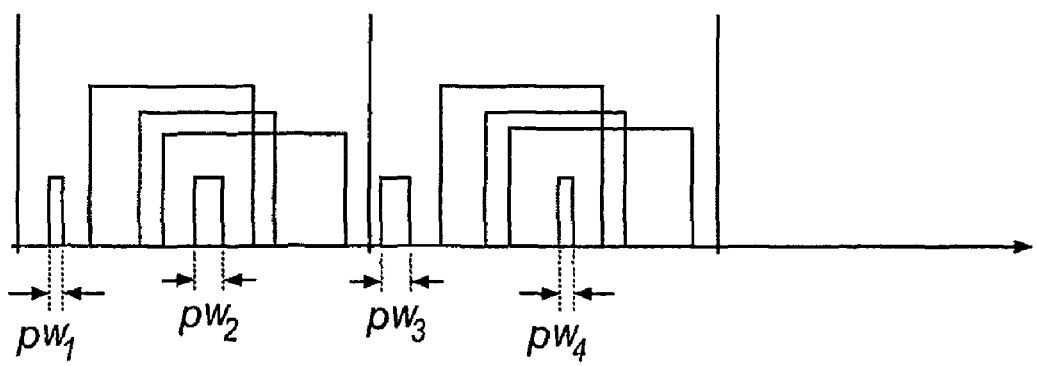

The timing diagram of yet an alternative embodiment is shown in FIG. 2f. Here the width of the detection pulses $pw_1$-$pw_4$ is varied from frame to frame. The corresponding light output signal is divided by that width, i.e. time. By this detection pulse width modulation, which is optionally combined with averaging, also the disturbing effect of periodic environmental light can be eliminated/mitigated. Since the starting time and/or the finishing time of the detection pulses vary also this embodiment is defined as realising a-periodic detection.

Figure 2G:
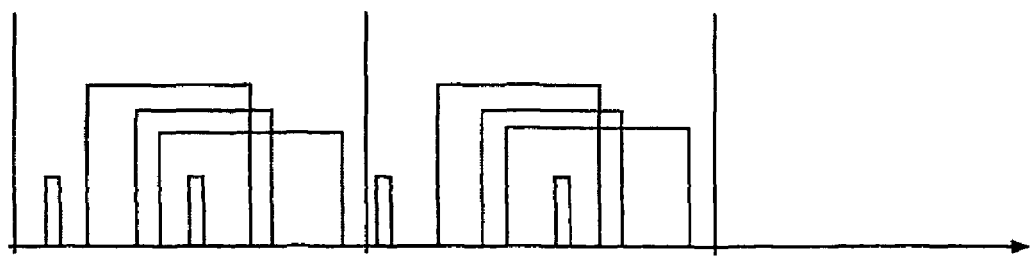

The timing diagram of yet an alternative embodiment is shown in FIG. 2g. Here the LEDs are turned on sequentially, and during some period all of them are simultaneously emitting light. The method of shifting the detection pulses in time within the emission windows, as shown in FIG. 2a, is applied.

Above, embodiments of the emitting unit according to the present invention have been described. These should be seen as merely non-limiting examples. As understood by a skilled person, many modifications and further alternative embodiments are possible within the scope of the invention.

The principles illustrated in FIGS. 2c and 2f can be applied for the four pulse case shown in FIG. 1 as well. For reasons of clarity the two pulse case has been illustrated.

The time windows for emission of LED light can be arranged in an non-overlapping way, such that LED light of a single colour is emitted during each detection pulse.

The detector is most schematically placed at the exit end of the emitting unit. In practise, of course the detector can be arranged in many places, such as side by side with the LEDs on a PCB, at a side wall of the emitting unit, etc. Further, depending on the placement and other factors, the detector can be illuminated with either direct light or reflected light from the LEDs. One example is shown in the published patent application WO 02/099333, where the detector is arranged among the LEDs. A reflector reflecting a fraction of the light output onto the detector is arranged in the light output of the emitting unit.

Most of the above-described alternatives for achieving the a-periodic character can be combined as desired.

Thus, as explained by means of the embodiments above, an a-periodicity is introduced into the feedback processing of the light output. From a processing view, the detections of light output are performed a-periodically, for example by a-periodically generating detection pulses to the detector or by generating the LED emissions a-periodically, or combinations thereof. This provides a possibility by means of conventional suppression algorithms to eliminate or reduce interfering environmental light, particularly pulsed light.

It is to be noted, that for the purposes of this application, and in particular with regard to the appended claims, the word "comprising" does not exclude other elements or steps, that the word "a" or "an", does not exclude a plurality, which per se will be apparent to a person skilled in the art. Further, as is understood by a person skilled in the art, the hardware described above at least partly can be realized in software as well.

The invention claimed is:

1. A control system for controlling the light output of an emitting unit comprising at least one LED and emitting light of at least one colour, the control system comprising:
   a detection unit for detecting the light output of the emitting unit and providing a light output signal,
   a detection pulse generator for providing detection pulses to the detection unit,
   a suppression unit for suppressing environmental light interferences in the light output signal and an adjusted light output signal, and
   a control unit for controlling the light output of the emitting unit on basis of a comparison between a reference signal representing a desired light output of the emitting unit and the adjusted light output signal,
   wherein said detection pulse generator generates detection pulses a-periodically within a predetermined periodical time frame.

2. A control system according to claim 1, wherein the detection pulses start at different times, relative to the beginning of said predetermined periodical time frame.

3. A control system according to claim 2, wherein each of the detection pulses is generated in order to detect a predetermined combination of LED light colours, which combination is present within time intervals of said predetermined periodical time frame, and wherein the detection pulse generator is arranged to omit the detection pulses in some of the time intervals of said predetermined periodical time frame.

4. A control system according to claim 1, wherein the control unit further is arranged to control energising of the LEDs, and wherein said energising is a-periodic.

5. A control system according to claim 4, wherein said energising of the LEDs is rendered a-periodic by shifting and/or mirroring the time intervals in relation to the beginning of said predetermined periodical time frame.

6. A control system according to claim 1, wherein the suppression unit comprises an averaging unit.

7. A control system according to claim 1, wherein the suppression unit comprises a subtraction unit arranged to subtract a background light signal from the light output signal.

8. A control system according to claim 1, wherein the width of the detection pulses is varied.

9. A method for controlling an emitting unit comprising at least one LED and emitting light of at least one colour, the method comprises the steps of:
   a-periodically detecting light output of the emitting unit within a predetermined periodical time frame and thus generating a light output signal;
   suppressing environmental interference in the light output signal and thus generating an adjusted light output signal;
   comparing the adjusted light output signal with a reference signal representing a desired light output of the emitting unit; and
   controlling the light output of the emitting unit on basis of said comparison.

10. A method according to claim 9, wherein said step of a-periodically detecting light output of the emitting unit within a predetermined periodical time frame comprises generating detection pulses at different times, relative to the beginning of said predetermined periodical time frame.

11. A method according to claim 10, wherein the detection pulses generated in order to detect a predetermined combination of LED light colours, which combination is present within time intervals of said predetermined periodical time frame, and said step of a-periodically detecting light output of the emitting unit within a predetermined periodical time frame comprises omitting the pulse generation for some of the time intervals of said predetermined periodical time frame.

12. A method according to claim 9, wherein said step of a-periodically detecting light output of the emitting unit within a predetermined periodical time frame comprises varying a duration of said predetermined periodical time frame.

13. A method according to claim 9, further comprising the step of a-periodically energising the LEDs.

14. A method according to claim 13 wherein said step of a-periodically energising the LEDs comprises shifting and/or mirroring the time intervals in relation to the beginning of said predetermined periodical time frame.

15. A method according to claim 9, wherein said step of suppressing environmental interference in the light output signal and thus generating an improved light output signal comprises a step of averaging light output signals.

16. A method according to claim 9, wherein said step of suppressing environmental interference in the light output signal and thus generating an improved light output signal comprises a step of subtracting a background light signal from said light output signal.

* * * * *